US 12,456,193 B2

(12) United States Patent
Kusu et al.

(10) Patent No.: US 12,456,193 B2
(45) Date of Patent: Oct. 28, 2025

(54) PROGRAM, INFORMATION PROCESSING DEVICE, AND INFORMATION PROCESSING METHOD

(71) Applicant: TERUMO KABUSHIKI KAISHA, Tokyo (JP)

(72) Inventors: Kohtaroh Kusu, Ebina (JP); Yuki Sakaguchi, Fujisawa (JP)

(73) Assignee: TERUMO KABUSHIKI KAISHA, Tokyo (JP)

( * ) Notice: Subject to any disclaimer, the term of this patent is extended or adjusted under 35 U.S.C. 154(b) by 431 days.

(21) Appl. No.: 18/180,965

(22) Filed: Mar. 9, 2023

(65) Prior Publication Data
US 2023/0222655 A1    Jul. 13, 2023

Related U.S. Application Data

(63) Continuation of application No. PCT/JP2021/035512, filed on Sep. 28, 2021.

(30) Foreign Application Priority Data

Sep. 29, 2020   (JP) .................................. 2020-163916

(51) Int. Cl.
G06K 9/00         (2022.01)
G06T 7/00         (2017.01)
(Continued)

(52) U.S. Cl.
CPC ............. *G06T 7/0012* (2013.01); *G06T 7/12* (2017.01); *G06V 10/25* (2022.01); *G06T 2207/30021* (2013.01); *G06V 2201/07* (2022.01)

(58) Field of Classification Search
CPC ............. G06T 7/00; G06K 9/00; A61K 35/12
(Continued)

(56) References Cited

U.S. PATENT DOCUMENTS 9,349,178 B1*   5/2016  Itu .......................... G16H 50/20
2005/0249391 A1* 11/2005 Kimmel ................. G06T 7/143
                                                              382/128
(Continued)

FOREIGN PATENT DOCUMENTS

JP        2013505782 A    2/2013
JP        2014090887 A    5/2014
(Continued)

OTHER PUBLICATIONS

High density mapping and catheter ablation of atrial tachycardias in adults with congenital heart disease Ulrich Krause1 • Matthias J. Müller1 (Year: 2020).*

(Continued)

*Primary Examiner* — Seyed H Azarian
(74) *Attorney, Agent, or Firm* — Buchanan Ingersoll & Rooney PC

(57) ABSTRACT

A non-transitory computer-readable medium storing a computer program executed by a computer processor to execute a process including: acquiring a medical image generated based on a signal detected by a catheter inserted into a luminal organ; detecting an object region included in the medical image by inputting the acquired medical image into a model trained for detecting the object region included in the medical image; calculating reliability of each of a plurality of boundary points located on a boundary between the detected object region and another image area in the medical image; and correcting the boundary based on a detection result of the object region by the model by performing interpolation using the boundary points at which the calculated reliability satisfies a predetermined standard.

17 Claims, 14 Drawing Sheets

(51) Int. Cl.
*G06T 7/12* (2017.01)
*G06V 10/25* (2022.01)

(58) Field of Classification Search
USPC ....... 382/100, 103, 106, 128–132, 156, 168, 382/173, 181, 191, 199, 219, 224, 254, 382/274, 286, 305; 378/4, 21, 41
See application file for complete search history.

(56) References Cited

U.S. PATENT DOCUMENTS

| | | | |
|---|---|---|---|
| 2011/0071404 A1 | 3/2011 | Schmitt et al. | |
| 2014/0254900 A1 | 9/2014 | Sturm | |
| 2019/0311478 A1 | 10/2019 | Avendi et al. | |
| 2020/0129141 A1* | 4/2020 | Smalling | A61B 6/06 |
| 2020/0234461 A1* | 7/2020 | Osumi | G06T 7/136 |
| 2021/0093292 A1* | 4/2021 | Baram | A61B 8/4477 |
| 2021/0315627 A1* | 10/2021 | Babkin | A61B 18/02 |
| 2025/0143798 A1* | 5/2025 | Gopinath | A61B 8/466 |

FOREIGN PATENT DOCUMENTS

| | | |
|---|---|---|
| JP | 2016525893 A | 9/2016 |
| JP | 2019525786 A | 9/2019 |
| JP | 2020114302 A | 7/2020 |

OTHER PUBLICATIONS

International Search Report (PCT/ISA/210) with translation and Written Opinion (PCT/ISA/237) mailed on Dec. 7, 2021, by the Japan Patent Office as the International Searching Authority for International Application No. PCT/JP2021/035512. (9 pages).

English Translations of the International Search Report (Form PCT/ISA/210) and the Written Opinion of the International Searching Authority (Form PCT/ISA/237) issued Dec. 7, 2021, by the Japan Patent Office in corresponding International Application No. PCT/JP2021/035512. (6 pages).

* cited by examiner

FIG. 4
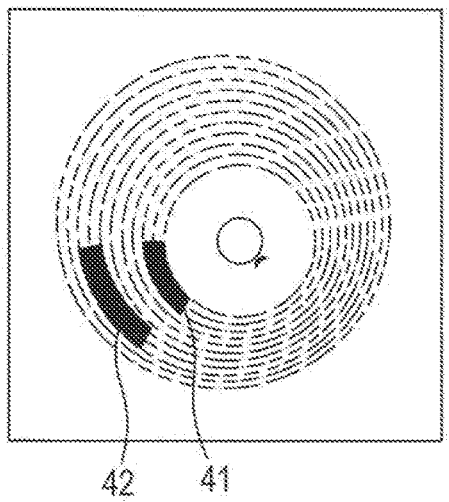
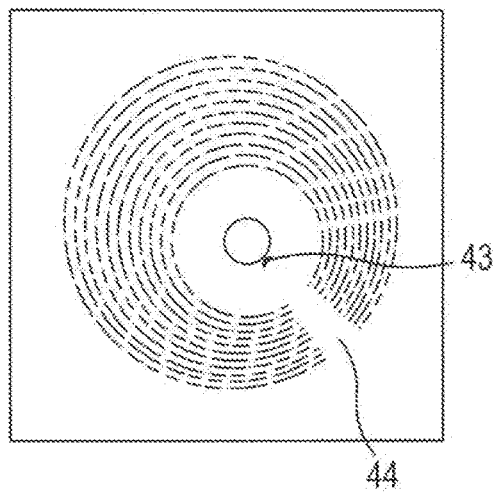
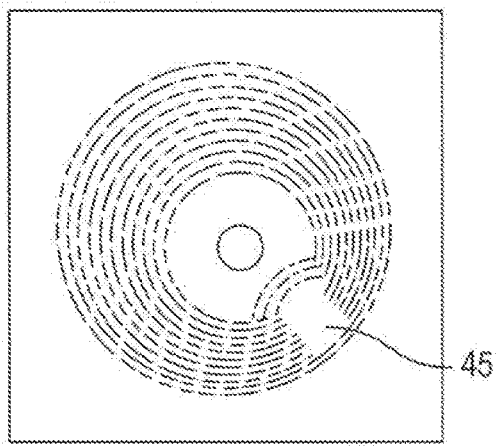
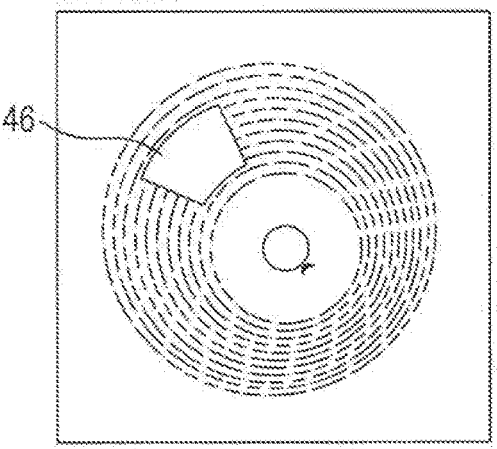

PROGRAM, INFORMATION PROCESSING DEVICE, AND INFORMATION PROCESSING METHOD

CROSS-REFERENCES TO RELATED APPLICATIONS

This application is a continuation of International Application No. PCT/JP2021/035512 filed PCT/JP2021/035512 filed on Sep. 28, 2021, which claims priority to Japanese Application No. 2020-163916 filed on Sep. 29, 2020, the entire content of both of which is incorporated herein by reference.

TECHNOLOGICAL FIELD

The present disclosure generally relates to a program, an information processing device, and an information processing method.

BACKGROUND DISCUSSION

In general, medical image diagnostic devices that generate images of the inside of the human body, such as ultrasonic diagnostic devices or X-ray photography devices, are known. Then, diagnosis and treatment are widely executed using medical images obtained from such types of medical image diagnostic devices.

For the purpose of assisting diagnosis of doctors, technologies of adding information to medical images through image processing or machine learning have been developed. For example, Japanese Patent Application Publication No. 2016-525893 A discloses a method of detecting an object of interest in a blood vessel image based on a set of co-registered medical image data obtained from a large number of imaging modalities.

An artifact may appear in a medical image. An artifact is a virtual image that is not intended or does not actually exist, and is an image that is formed due to a device capturing a medical image, imaging conditions, or the like. In such a case, there is a problem that an object is not appropriately detected from a medical image.

SUMMARY

A program is disclosed that is capable of appropriately detecting an object region in a medical image.

According to an aspect of the present disclosure, a non-transitory computer-readable medium storing a computer program executed by a computer processor to execute a process including: acquiring a medical image generated based on a signal detected by a catheter inserted into a luminal organ; detecting an object region included in the medical image by inputting the acquired medical image into a model trained for detecting the object region included in the medical image; calculating reliability of each of a plurality of boundary points located on a boundary between the detected object region and another image area in the medical image; and correcting the boundary based on a detection result of the object region by the model by performing interpolation using the boundary points at which the calculated reliability satisfies a predetermined standard.

According to another aspect, an information processing device is disclosed, which includes: a control unit configured to: acquire a medical image generated based on a signal detected by a catheter inserted into a luminal organ; detect an object region included in the medical image by inputting the acquired medical image into a model trained for detecting the object region included in the medical image; calculate reliability of each of a plurality of boundary points located on a boundary between the detected object region and another image area in the medical image; and correct the boundary based on a detection result of the object region by the model by performing interpolation using the boundary points at which the calculated reliability satisfies a predetermined standard.

According to a further aspect, an information processing method is disclosed, which includes: acquiring a medical image generated based on a signal detected by a catheter inserted into a luminal organ; detecting an object region included in the medical image by inputting the acquired medical image into a model trained for detecting the object region included in the medical image; calculating reliability of each of a plurality of boundary points located on a boundary between the detected object region and another image area in the medical image; and correcting the boundary based on a detection result of the object region by the model by performing interpolation using the boundary points at which the calculated reliability satisfies a predetermined standard.

According to the present disclosure, it is possible to appropriately detect an object region in a medical image.

BRIEF DESCRIPTION OF THE DRAWINGS

FIG. 4 is a conceptual diagram illustrating an example of an artifact occurring in a medical image.

DETAILED DESCRIPTION

Set forth below with reference to the accompanying drawings is a detailed description of embodiments of a program, an information processing device, and an information processing method. Note that since embodiments described below are preferred specific examples of the present disclosure, although various technically preferable limitations are given, the scope of the present disclosure is not limited to the embodiments unless otherwise specified in the following descriptions.

First Embodiment

Figure 1:
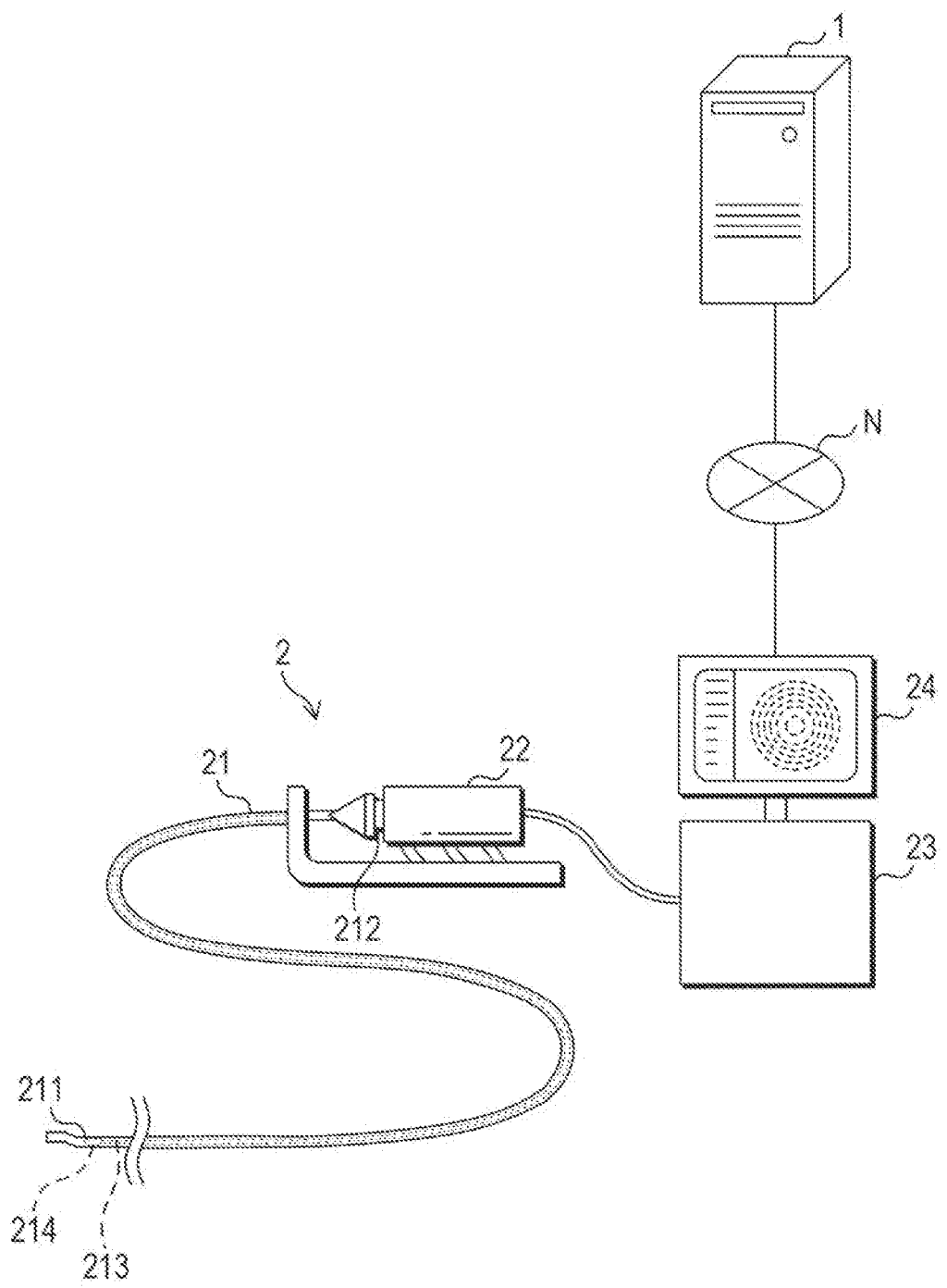
FIG. 1 is an explanatory diagram illustrating an exemplary configuration of an image diagnostic system.

FIG. 1 is an explanatory diagram illustrating an exemplary configuration of an image diagnostic system. The image diagnostic system includes an information processing device 1 and an image diagnostic device 2. The information processing device 1 and the image diagnostic device 2 are connected to be able to communicate with each other via a network N such as a local area network (LAN) or the Internet.

The image diagnostic device 2 can be an device unit that images a luminal organ of a subject. The image diagnostic device 2 is an device unit that can generate a medical image including an ultrasound tomographic image of a blood vessel of a subject by, for example, an intravascular ultrasound (IVUS) method using the catheter 21 and executes ultrasound inspection and diagnosis of a blood vessel. The image diagnostic device 2 includes the catheter 21, a motor drive unit (MDU) 22, an image processing device 23, and a display device 24.

The catheter 21 can be an image diagnosis catheter that obtains an ultrasonic tomographic image of a blood vessel by the IVUS method. The ultrasound tomographic image is an example of a catheter image generated using the catheter 21. The catheter 21 includes a probe portion 211 and a connector portion 212 disposed at an end of the probe portion 211. The probe portion 211 is connected to the MDU 22 via the connector portion 212. A shaft 213 is inserted into the probe portion 211. A sensor 214 is connected to the distal end side of the shaft 213.

The sensor 214 can be an ultrasonic transducer, and can transmit ultrasonic waves based on a pulse signal in a blood vessel and receive reflected waves reflected from a biological tissue of the blood vessel or a medical device. The shaft 213 and the sensor 214 are configured to be able to move forward and backward in the longitudinal direction of the blood vessel while being rotated in the circumferential direction of the blood vessel inside the probe portion 211.

The MDU 22 is a drive device to which the catheter 21 is detachably attached, and controls an operation of the catheter 21 inserted into the blood vessel by driving an internal motor in response to a manipulation of a user. The MDU 22 rotates the shaft 213 and the sensor 214 in the circumferential direction while moving the shaft 213 and the sensor 214 in the longitudinal direction from the distal end side to the proximal end side. The sensor 214 continuously scans the inside of the blood vessel at predetermined time intervals and outputs reflected wave data of the detected ultrasonic waves to the image diagnostic device 2.

The image processing device 23 can be a processing device that can generate an ultrasound tomographic image (medical image) of a blood vessel based on reflected wave data output from an ultrasound probe of the catheter 21. The image processing device 23 can generate one image for each rotation of the sensor 214. The generated image can be a lateral tomographic image centering on the probe portion 211 and substantially perpendicular to the probe portion 211. The image processing device 23 continuously generates a plurality of lateral tomographic images at predetermined intervals by a pull-back manipulation of rotating the sensor 214 while pulling the sensor 214 toward the MDU 22 at a constant speed. The image processing device 23 displays the generated ultrasound tomographic image on the display device 24 and includes an input interface for receiving inputs of various setting values when inspection is executed.

The display device 24 can be, for example, a liquid crystal display panel, an organic EL display panel, or the like. The display device 24 displays a medical image generated by the image processing device 23, an estimation result received from the information processing device 1, or the like.

In the present embodiment, the intravascular inspection will be described as an example, but a luminal organ to be inspected is not limited to a blood vessel and may be, for example, an organ such as an intestine. The catheter 21 may be a catheter that generates an optical tomographic image, for example, for optical coherence tomography (OCT) or optical frequency domain imaging (OFDI) in which an optical tomographic image is generated using near infrared light. In this case, the sensor 214 is a transceiver unit that emits near infrared light and receives reflected light. The catheter 21 may have sensors 214 of both an ultrasonic transducer and a transceiver unit for OCT or OFDI, and may be a sensor that generates a catheter image including both an ultrasonic tomographic image and an optical tomographic image.

The information processing device 1 is an information processing device capable of executing various types of information processing and transmitting and receiving information and can be, for example, a server computer, a personal computer, or the like. The information processing device 1 may be a local server installed in the same facility (for example, a hospital or the like) as the image diagnostic device 2 or may be a cloud server connected to be able to communicate with the image diagnostic device 2 via, for example, the Internet. The information processing device 1 functions as a detection device that detects an object region such as a lumen region from a medical image generated by the image diagnostic device 2 using a first learning model 141 (see FIG. 2) and provides a detection result to the image diagnostic device 2. In particular, the information processing device 1 according to the present embodiment preferably provides a detection result in which an object region is detected by executing preprocessing to be described below on a medical image input into the first learning model 141.

Figure 2:
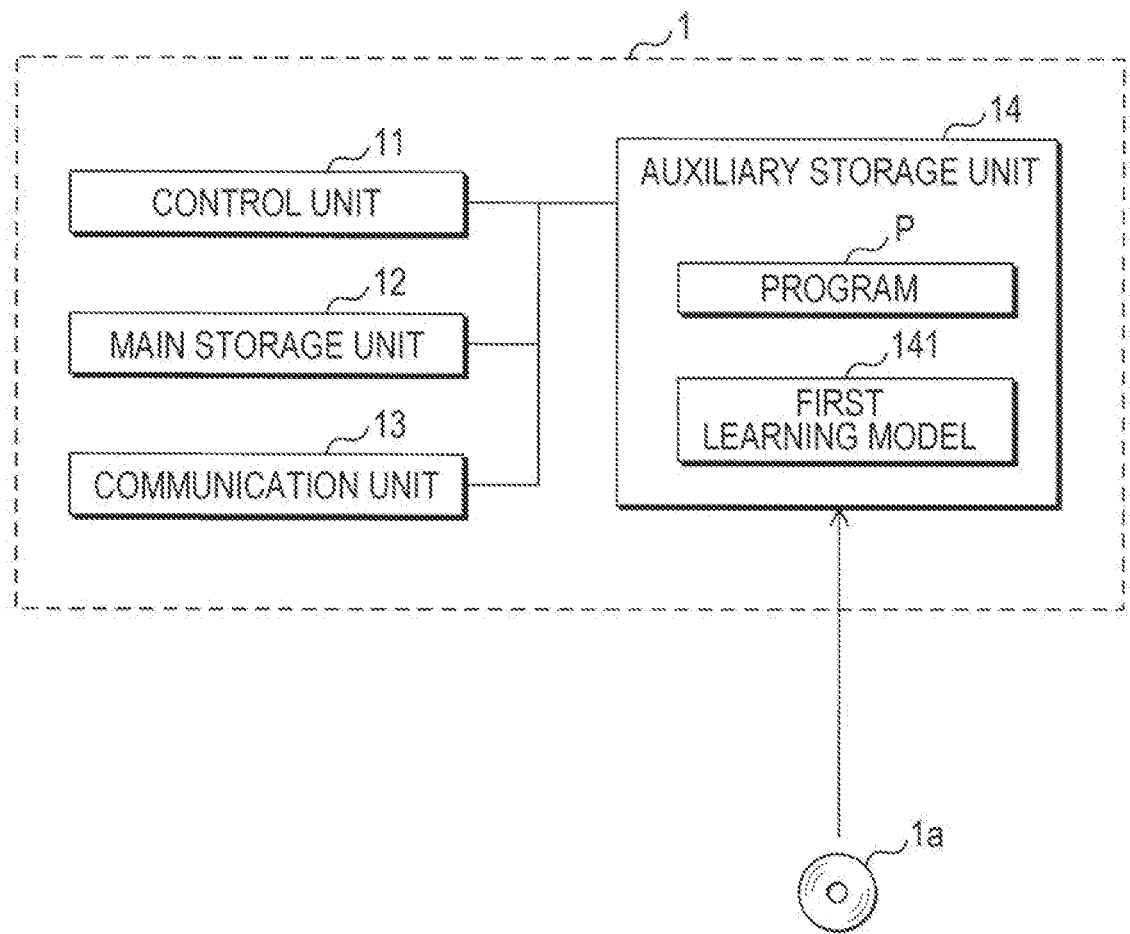
FIG. 2 is a block diagram illustrating an exemplary configuration of an information processing device.

FIG. 2 is a block diagram illustrating an exemplary configuration of the information processing device 1. The information processing device 1 can include a control unit 11, a main storage unit 12, a communication unit 13, and an auxiliary storage unit 14. The information processing device 1 may be a multi-computer including a plurality of computers or may be a virtual machine virtually constructed by software.

The control unit 11 can include, for example, one or a plurality of arithmetic processing units such as a central processing unit (CPU), a micro-processing unit (MPU), and a graphics processing unit (GPU) and executes various types of information processing, control processing, and the like by reading and executing a program P stored in the auxiliary storage unit 14. The main storage unit 12 can be, for example, a temporary storage region of a static random access memory (SRAM), a dynamic random access memory (DRAM), a flash memory, or the like and temporarily stores data necessary for the control unit 11 to execute arithmetic processing. The communication unit 13 is a communication module executing processing related to communication, and transmits and receives information to and from the outside.

The auxiliary storage unit 14 can be, for example, a nonvolatile storage area such as a large-capacity memory or a hard disk. The auxiliary storage unit 14 stores programs and data referred to by the control unit 11, including the program P. The auxiliary storage unit 14 stores the first learning model 141. The auxiliary storage unit 14 may additionally store a second learning model 142, a third learning model 143, and the like. Learning models other than the first learning model 141 will be described in detail in other embodiments. The auxiliary storage unit 14 may be an external storage device connected to the information processing device 1.

The program P may be written on the auxiliary storage unit 14 in a manufacturing stage of the information processing device 1, or the program P distributed by a remote server device may be acquired through communication by the information processing device 1 to be stored in the auxiliary storage unit 14. The program P may be recorded in a readable manner on a recording medium 1a such as a magnetic disk, an optical disc, or a semiconductor memory.

According to the present embodiment, the information processing device 1 is not limited to the above configuration and may include, for example, an input unit that receives a manipulation input and a display unit that displays an image.

Figure 3:
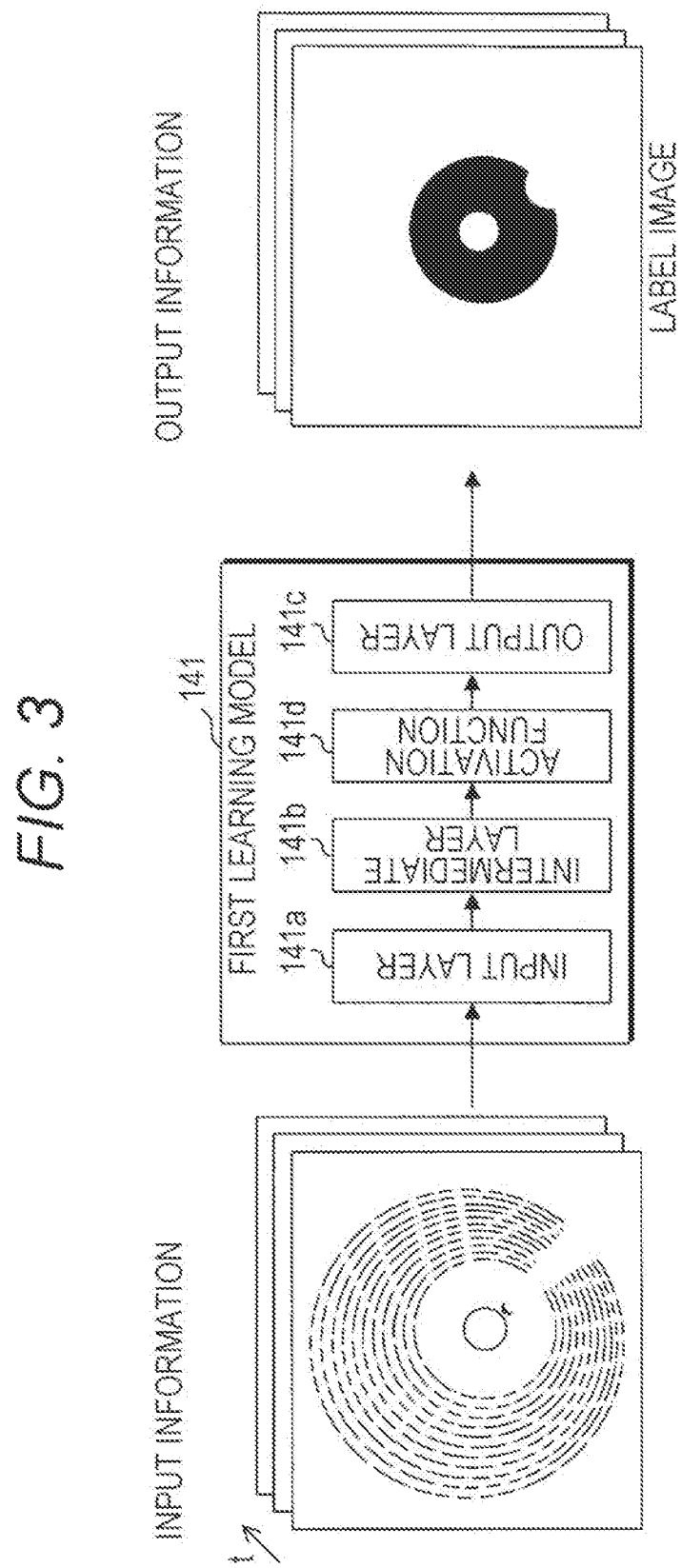
FIG. 3 is a schematic diagram illustrating a first learning model.

FIG. 3 is a schematic diagram illustrating the first learning model 141. The first learning model 141 can be a machine learning model configured to output a detection result of detecting an object region in a medical image when the medical image is input. An object can be, for example, a blood vessel lumen, a blood vessel membrane, a blood vessel wall portion, a stent (a medical instrument which is in a blood vessel), a guide wire, a calcified portion in a blood vessel, or the like. In FIG. 3, an example of the first learning model 141 that detects a lumen region of a blood vessel as an object region will be described. The first learning model 141 is defined by definition information. The definition information of the first learning model 141 can include, for example, structure information and layer information of the first learning model 141, information regarding nodes included in each layer, and parameters such as weights and biases between nodes. The auxiliary storage unit 14 stores definition information regarding the first learning model 141. The first learning model 141 can be used as a program module configuring a part of artificial intelligence software.

The first learning model 141 can be, for example, a convolutional neural network (CNN) trained by deep learning. The first learning model 141 recognizes an object region in units of pixels by an image recognition technology using so-called semantic segmentation.

The first learning model 141 can include an input layer 141a to which a medical image is input, an intermediate layer 141b that extracts and restores a feature amount of the image, and an output layer 141c that outputs a label image indicating an object region included in the medical image in units of pixels. The first learning model 141 can be, for example, U-Net.

The input layer 141a of the first learning model 141 can include a plurality of nodes that receive an input of a pixel value of each pixel included in the medical image, and delivers the input pixel value to the intermediate layer 141b. The intermediate layer 141b includes a plurality of nodes that extract a feature amount of input data and delivers the feature amount extracted using various parameters to the output layer. The intermediate layer 141b can include a convolution layer (CONV layer) and a deconvolution layer (DECONV layer). The convolution layer is a layer that dimensionally compresses image data. The feature amount of the object region is extracted by the dimension compression. The deconvolution layer executes deconvolution processing to restore the original dimension. Through the restoration processing in the deconvolution layer, a binarized label image indicating whether each pixel in the image is an object region can be generated.

The output layer 141c can include one node or a plurality of nodes that output label images. The label image can be, for example, a binarized image and is an image in which a pixel corresponding to a lumen region of a blood vessel is class "1" and a pixel corresponding to other images is class "0." The output layer 141c converts an output value of class classification for each pixel into a probability using, for example, an activation function 141d that is a softmax function based on the feature amount input from the intermediate layer 141b. A label image classified for each pixel is output based on the converted probability. The activation function 141d is not limited to the softmax function, and another sigmoid function, for example, a ReLU function, or the like may be used.

According to the present embodiment, the first learning model 141 receives medical images of a plurality of frames which continue in time series as an input and detects an object region from the medical image of each frame. Specifically, the first learning model 141 receives, as an input, medical images of a plurality of frames which continue along the longitudinal direction of a blood vessel through scanning of the catheter 21. The first learning model 141 detects the object region from the medical image of each frame continuous along a time axis t.

The first learning model 141 is generated and trained in advance in the information processing device 1 or an external device. The control unit 11 of the information processing device 1 trains the first learning model 141 by collecting in advance, as training data, an information group in which labels of existing object regions are assigned to many images collected in the past. In the object region, for example, a determination executed by a doctor who has specialized knowledge may be used as a correct answer label. The control unit 11 classifies the collected training data and, and sets some of the training data as test data and sets the rest training data as training data.

The control unit 11 inputs medical images of learning data (training data) extracted from the information group to the first learning model 141 as input data. The control unit 11 calculates an error between the output value output from the first learning model 141 and the correct answer label of the training data extracted from the information group by the loss function (error function). As the loss function, for example, a mean square error E expressed by the following (Expression 1) can be used.

Mathematical Expression 1

$$E = \frac{1}{2}\sum_{k}(y_k - t_k)^2 \quad (1)$$

Here, yk indicates an output value output from the first learning model 141, tk indicates training data, and k indicates the number of pieces of data (the number of dimensions).

The control unit 11 executes learning by repeating updating of various parameters, weights, and the like configured in the first learning model 141 using, for example, a back propagation method so that the calculated error is minimized. Various parameters and weights are optimized, and the first learning model 141 outputs an object region when medical images are input.

The control unit 11 evaluates whether the machine learning of the first learning model 141 has been properly executed. Specifically, the medical image of the test data (the training data) are input to the first learning model 141, and an error of an output value output from the first learning model 141 can be calculated. The control unit 11 determines whether the error of the output value is less than a threshold (i.e., predetermined threshold). When the error is less than the threshold, it is determined that the training has been properly executed, and the training of the first learning model 141 ends. Accordingly, when the medical images are input, since the first learning model 141 is trained, the object region can be appropriately detected and constructed.

According the present embodiment, the first learning model 141 can be a CNN and a semantic segmentation model, but the configuration of the model is not limited. The first learning model 141 may be able to identify a position and shape of an object in the medical image. The first learning model 141 may be a model which is based on another learning algorithm such as a recurrent neural network (RNN), a support vector machine (SVM), or a regression tree.

Here, an artifact in a medical image will be described. FIG. 4 is a conceptual diagram illustrating an example of an artifact occurring in a medical image. An artifact may occur in a medical image generated by the image diagnostic device 2. The artifact is an image of a portion which is not an inspection target, or a virtual image that does not actually exist and is an image that is formed due to a device, imaging conditions, a manipulation method of the catheter 21, and the like. An example of an artifact occurring in a medical image will be described with reference to FIG. 4. The artifact is not limited to the example of FIG. 4.

For example, if there is calcified tissue 41 in a blood vessel, the artifact 42 is formed at a position of an equal distance between the calcified tissue 41 and the catheter 21. When there is the calcified tissue 41, ultrasonic waves transmitted from the catheter 21 are reflected many times in the biological lumen to form the artifact 42 that is a white and bright image. Such a phenomenon is called multiple reflection.

In a part where there is a guide wire, the substantially fan-shaped artifact 44 is formed on the radially outer side of the catheter 21 than the guide wire image 43. When there is the guide wire, most of the ultrasonic waves are reflected by the guide wire that is a strong reflector, and thus the ultrasonic waves transmitted radially outward of the catheter 21 are considerably attenuated than the guide wire, and the artifact 44 in which a part of the image falls out in black is formed. Such a phenomenon is called an acoustic shadow. Additionally, similar artifacts are formed outside of a part where a stent is placed, a part calcified to a high strength or a high attenuation plaque.

If there is a false lumen between the intima and media of the blood vessel, an artifact 45 corresponding to the false lumen area can be formed. When a false lumen region is displayed, the region information of the lumen, which is the original detection target, is likely to be erroneously extracted. According to the present embodiment, an image of a portion which is not an inspection target including such a false lumen region is also included as one kind of artifact.

If bubbles remain in an air trap at the distal end of the catheter 21, an artifact 46 can be formed in a portion of the image. The ultrasonic waves are attenuated by the air bubbles, and a part of the image becomes black, and thus the artifact 46 is formed.

Since the artifact described above occurs in the medical image, information of the object region which is a detection target is missing. The characteristics of the medical image change due to an influence of the artifact. Accordingly, when the object region is detected from the medical image including the artifact by using the first learning model 141, there is concern of the detection accuracy deteriorating. According to the present embodiment, when a medical image is acquired from the image diagnostic device 2, the information processing device 1 executes preprocessing to estimate detection accuracy in the medical image. Through the preprocessing, the object region is not detected from the medical image estimated to have a relatively low detection accuracy, and the object region is detected from only the medical image estimated to have a relatively high detection accuracy.

The preprocessing method according to the present embodiment will be specifically described. The preprocessing executed by the information processing device 1 includes derivation processing of determination information for determining whether to detect an object region from the medical image and determination processing for determining whether to detect an object region based on the determination information.

The determination information includes information regarding detection accuracy of the object region in the medical image. According to the present embodiment, the determination information includes an output of the activation function 141*d* included in the first learning model 141. As described above, the output layer 141*c* of the first learning model 141 outputs an output value indicating the class classification for each pixel of the medical image using the softmax function as the activation function 141*d*. The softmax function is a function of executing conversion such that a total value of output values corresponding to each class becomes 1.0. That is, the output value of the softmax function is a probability at which each pixel in the medical image is classified into class "1" (a lumen region in the blood vessel). The output value of the softmax function indicates certainty that the pixel is of the class "1" and indicates certainty of a detection result of the object region. The output value corresponding to each class is output as a numerical value in a range of 0.0 to 1.0. The information processing device 1 uses the first learning model 141 to acquire an output value for each pixel of the medical image.

The information processing device 1 determines whether to execute object region detection processing on the medical image based on the acquired output value of the activation function 141*d*. For example, when the output value of the lumen region for one pixel in the medical image is close to 1, the output value indicates that a probability of being the lumen region is relatively high and the accuracy of the detection result is relatively high. When the output value of the lumen region with respect to the pixel is close to 0, the output value indicates that a probability of not being the lumen region is relatively high and the accuracy of the detection result is relatively high. However, when the output value of the lumen region with respect to the pixel is around 0.5, both the probability of being the lumen region and the probability of not being the lumen region are relatively low and it is indicated that the accuracy of the detection result is relatively low. From this viewpoint, the information processing device 1 determines whether to execute the object region detection processing by determining the certainty with respect to the medical image based on the output value of the activation function 141d.

Specifically, by acquiring the number of pixels in which the output values of the activation function 141d are within a predetermined range (for example, a range of 0.4 to 0.6), a ratio of pixels in which the output values are within the predetermined range to all the pixels of the medical image can be calculated. When the ratio of pixels in which the output values are within the predetermined range is less than the threshold, it can be estimated that the detection accuracy of the object region in the medical image is relatively high. Therefore, it is determined that the object region is detected in the medical image. When the ratio of pixels in which the output values are within the predetermined range is equal to or more than the threshold, it can be estimated that the detection accuracy of the object region in the medical image is relatively low. Therefore, it is determined that the object region is not detected in the medical image. The determination of whether to execute detection is not limited to the using of the number of pixels, and a variance value of the output values in each pixel may be used.

Figure 5:
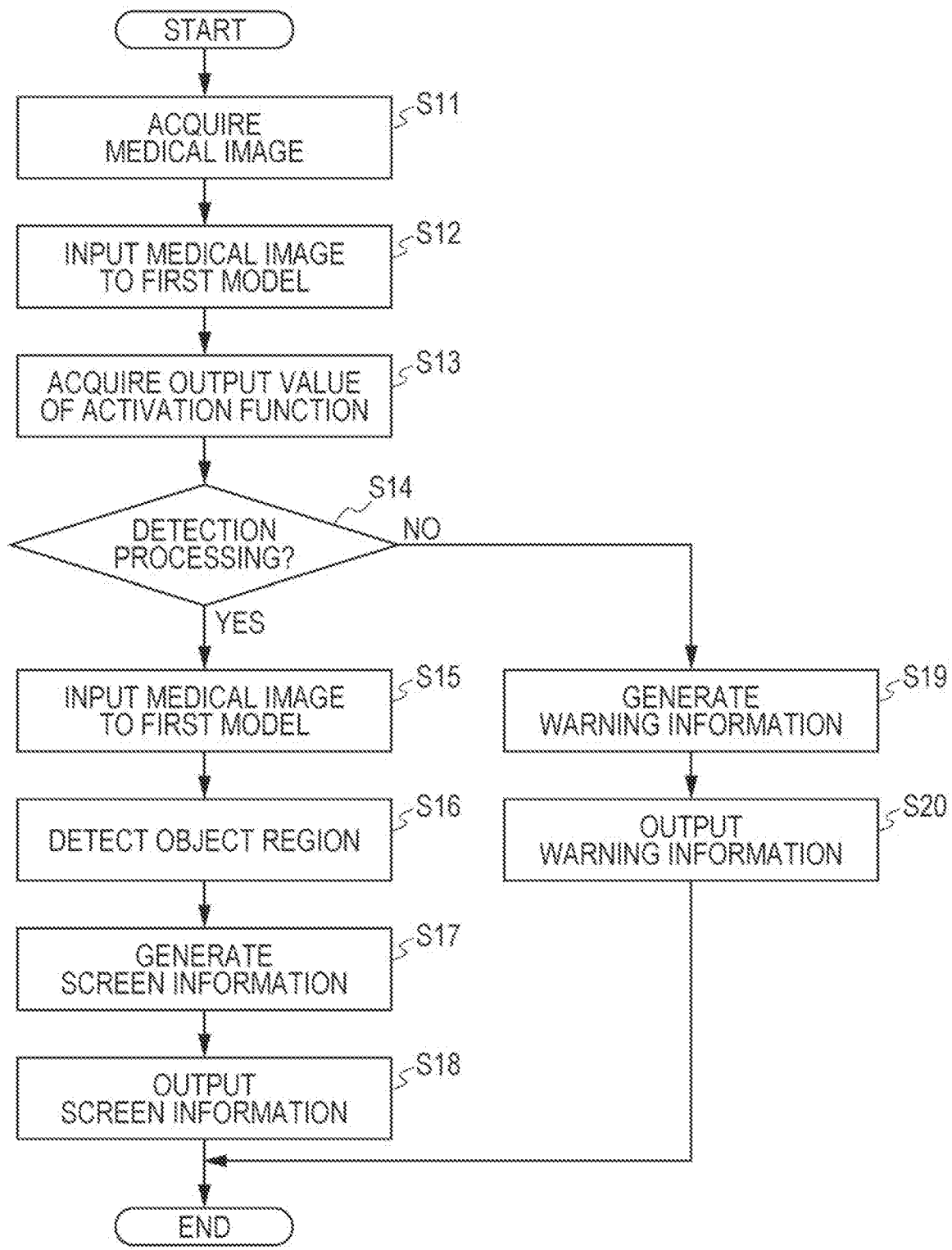
FIG. 5 is a flowchart illustrating an example of a processing procedure executed by the information processing device.

FIG. 5 is a flowchart illustrating an example of a processing procedure executed by the information processing device 1. When the MDU 22 executes the pull-back manipulation and the medical images are output from the image diagnostic device 2, the control unit 11 of the information processing device 1 executes the following processing in accordance with the program P.

The control unit 11 of the information processing device 1 acquires the medical images of a subject from the image diagnostic device 2 (S11). The acquired medical images are images of tomographic images of a plurality of frames which continue in time series. The control unit 11 causes the processing to derive the determination information.

The control unit 11 inputs the acquired medical images to the first learning model 141 (S12) and acquires the output value of the activation function 141d included in the first learning model 141 for each pixel (S13). As a result, the determination information is derived.

Subsequently, the control unit 11 determines whether to execute object region detection processing on the medical image based on the derived output value of the activation function 141d (S14). Specifically, it is determined whether to execute the detection processing by determining whether a ratio of the number of pixels in which the output values are within the predetermined range to the total number of pixels of the medical image is equal to or greater than a threshold.

When it is determined that the object region is detected in the acquired medical image because the ratio of pixels in which the output values are within the predetermined range is less than the threshold (YES in S14), the control unit 11 inputs the medical images to the first learning model 141 (S15). The control unit 11 detects the object region in the medical image by acquiring the output value output from the first learning model 141 (S16).

The control unit 11 generates image information for displaying the detected object region (S17). The control unit 11 outputs the generated image information to the image diagnostic device 2 (S18). In the image displayed based on the image information, the object region included in the medical image is displayed in a distinguishable display mode. The image can be, for example, an image obtained by superimposing a label image output from the first learning model 141 on an original medical image. For example, the control unit 11 processes the label image output from the first learning model 141 to a semitransparent mask and generates image information to be superimposed and displayed on the original medical image.

Conversely, when it is determined that the object region is not detected in the acquired medical image because the ratio of pixels in which the output values are within the predetermined range is equal to or greater than the threshold (NO in S14), the control unit 11 generates warning information (S19). The warning information includes warning screen information indicating that the object region is not detected by text or the like. The warning information may include audio data indicating that a detection of the object region is not executed by audio. The warning information may include information indicating a ratio of pixels in which the output values are within the predetermined range. The control unit 11 outputs the generated warning information to the image diagnostic device 2 (S20) and ends the series of processing. The control unit 11 may execute loop processing to return the processing to S11.

A doctor or the like can recognize a detection situation of the object in the medical image based on the warning information displayed via the image diagnostic device 2. The doctor or the like can take measures such as acquisition of the medical image again based on the warning information.

According to the present embodiment, an output destination of the image information, the warning information, or the like can be the image diagnostic device 2. However, the image information, the warning information, or the like may be output to a device (for example, a personal computer) other than the image diagnostic device 2 that is an acquisition source of the medical image.

According to the present embodiment, by executing the preprocessing before detection of the object region, the object region can be appropriately detected using only the medical image estimated to have high detection accuracy of the object region. An influence of the artifact in the medical image can be reduced and the accuracy of the detection result obtained by the first learning model 141 can be improved. Since a warning is displayed for the medical image estimated to have a relatively low detection accuracy of the object region, it is possible to reliably notify the doctor or the like that the object region is not detected.

Second Embodiment

In an image diagnostic system according to a second embodiment, content of determination information is different from that according to the first embodiment. Thus, the differences will be mainly described below. Since the other configurations are similar to those according to the first embodiment, the same reference numerals are given to the common configurations, and the detailed description of the same reference numerals will be omitted.

The determination information according to the second embodiment includes an evaluation index regarding detection accuracy of an object region included in a medical image. The information processing device 1 derives determination information using the second learning model 142. The second learning model 142 can be a machine learning model configured to output an evaluation index regarding detection accuracy of an object region included in a medical image when the medical image is input. The auxiliary storage unit 14 of the information processing device 1 stores definition information regarding the second learning model 142. The evaluation index regarding the detection accuracy of the object region is information indicating detection accuracy estimated when the object region is detected from the medical image. For example, as the evaluation index, a value of the loss function for an output value of the first learning model 141 that detects the object region included in the medical image may be used. As described above, the loss function indicates an error between the output value of the first learning model 141 and the correct answer label of the training data and is an index of accuracy of the first learning model 141.

Figure 6:
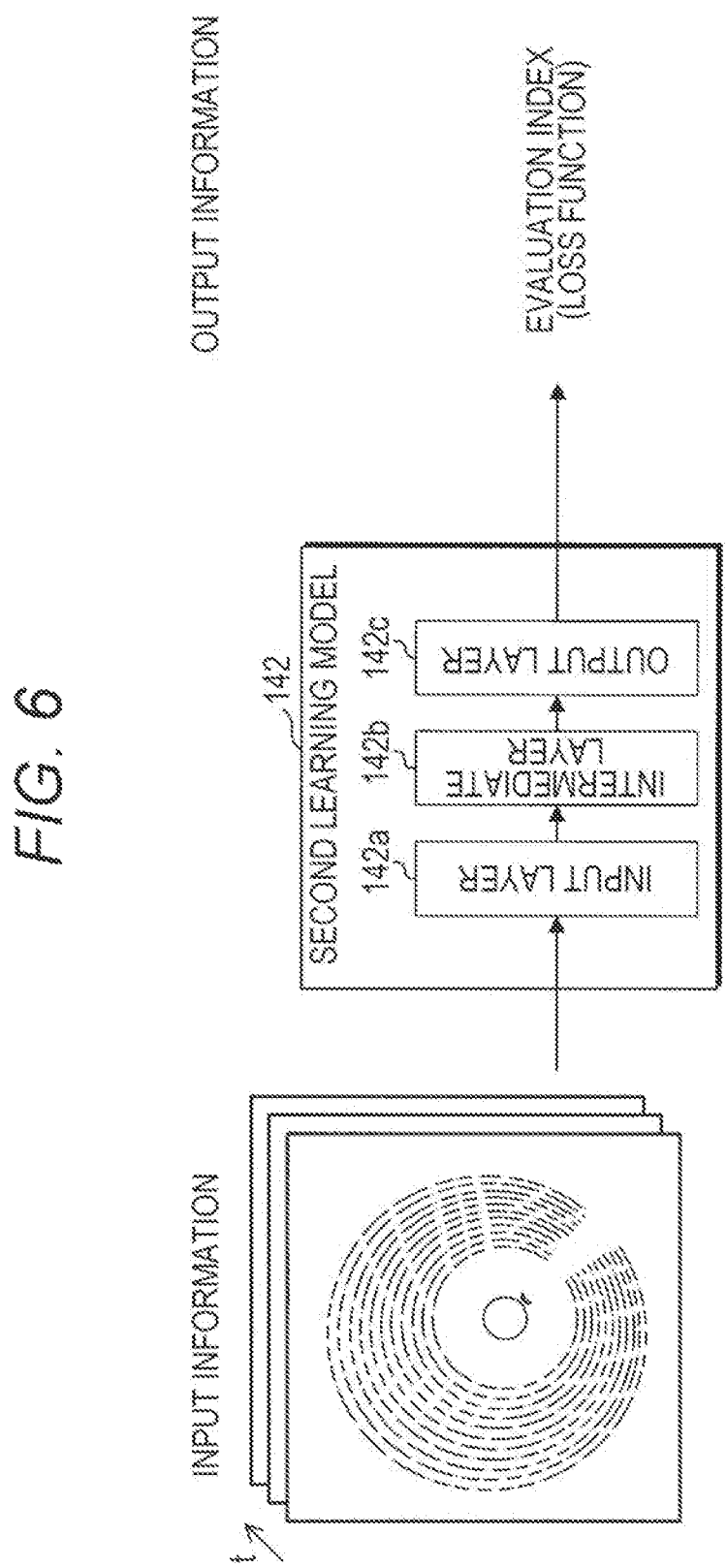
FIG. 6 is a schematic diagram illustrating a second learning model.

FIG. 6 is a schematic diagram illustrating the second learning model 142. The second learning model 142 can be, for example, a neural network model generated by deep learning and can be, for example, a CNN. The second learning model 142 includes an input layer 142a to which a medical image is input, an intermediate layer 142b that extracts a feature amount of an image, and an output layer 142c that outputs output data indicating an evaluation index for the medical image.

The input layer 142a of the second learning model 142 includes a plurality of nodes that receive an input of a pixel value of each pixel included in the medical image, and delivers the input pixel value to the intermediate layer 142b. The intermediate layer 142b includes a plurality of nodes that extract a feature amount of input data and delivers the feature amount extracted using various parameters to the output layer. The output layer 142c outputs continuous values indicating an evaluation index. The output layer 142c is not limited to a layer outputting a continuous value by regression and may output a discrete value indicating an evaluation index by classification.

In the present embodiment, the second learning model 142 can be a CNN, but the configuration of the model is not limited. For example, the second learning model 142 may be a model which is based on another learning algorithm such as RNN, SVM, or regression tree.

Figure 7:
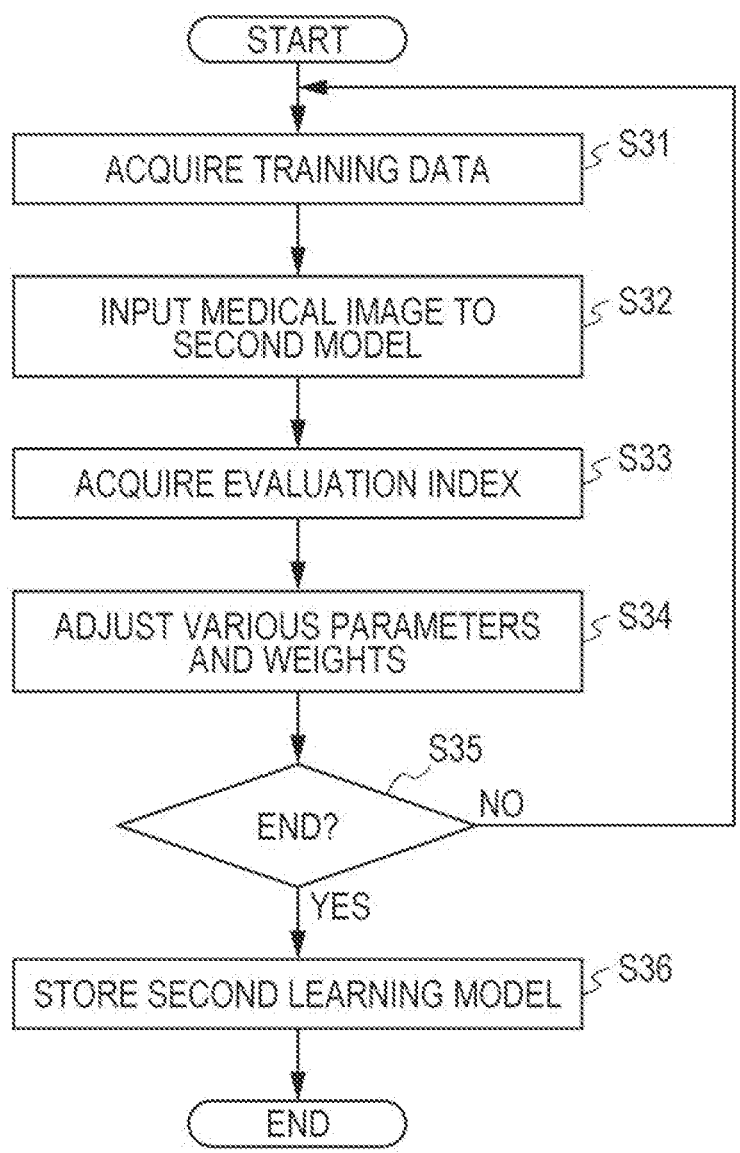
FIG. 7 is a flowchart illustrating a generation procedure of a second learning model.

The information processing device 1 can generate the second learning model 142 in advance and can use the second learning model 142 to derive the determination information. FIG. 7 is a flowchart illustrating a generation procedure of the second learning model 142.

The control unit 11 of the information processing device 1 acquires training data for training (learning) the second learning model 142 (S31). The training data includes a medical image and label data indicating an evaluation index related to detection accuracy of an object region included in the medical image. As the evaluation index, a value of the loss function obtained based on the first learning model 141 can be used. The first learning model 141 can be a semantic segmentation model, and the value of the loss function can include a total value of all image sizes of the loss function for each pixel of the medical image.

For example, the control unit 11 acquires, as training data, a plurality of information groups in which the loss function calculated in evaluation of learning in a generation stage of the first learning model 141 described above is associated with the medical image corresponding to the loss function. That is, the control unit 11 uses the medical image of the test data (training data) of the first learning model 141 and the value of the loss function for the object region output by the first learning model 141 when the medical image is input as the training data.

The control unit 11 inputs the medical image of the training data extracted from the information group to the second learning model 142 as input data (S32). The control unit 11 acquires the evaluation index (loss function) output from the second learning model 142 (S33). The control unit 11 calculates an error between the obtained evaluation index (output value) and the correct answer label of the training data extracted from the information group by a predetermined loss function. The control unit 11 adjusts various parameters, weights, and the like, for example, using the back propagation method so that the loss function is optimized (minimized or maximized) (S34). An initial setting value is given for the definition information describing the second learning model 142 before training is started.

The control unit 11 determines whether the learning ends (S35). For example, the control unit 11 acquires test data from the information group, inputs the test data to the second learning model 142, and determines that the learning ends when the calculated error satisfies a predetermined standard (or criterion). The control unit 11 may determine that the learning ends when the number of learnings satisfies the predetermined standard.

When it is determined that the learning does not end (NO in S35), the control unit 11 returns the processing to S31. When it is determined that the learning ends (YES in S35), the control unit 11 stores the definition information related to the second learning model 142 in the auxiliary storage unit 14 as the trained second learning model 142 (S36), and ends the processing according to this flowchart. Through the above-described processing, it is possible to construct the second learning model 142 trained so that the evaluation index related to the detection accuracy of the object region included in the medical image can be appropriately estimated for the medical image.

The information processing device 1 uses the evaluation index obtained by the second learning model 142 as determination information to determine whether to detect an object region from the medical image. In a medical image that has a relatively large evaluation index, detection of an object region is not executed because detection accuracy is estimated to be relatively low. Since a medical image that has a small evaluation index is estimated to have a relatively high detection accuracy, the object region can be detected.

Although the example in which the value of the loss function obtained based on the first learning model 141 is used as the evaluation index has been described above, the evaluation index is not limited to the loss function and may be information indicating the detection accuracy of the object region included in the medical image. For example, an accuracy rate, a matching rate, a reproduction rate, or the like of the first learning model 141 may be used as the evaluation index. As the evaluation index, for example, a value determined by a doctor or the like who has specialized knowledge may be used.

Figure 8:
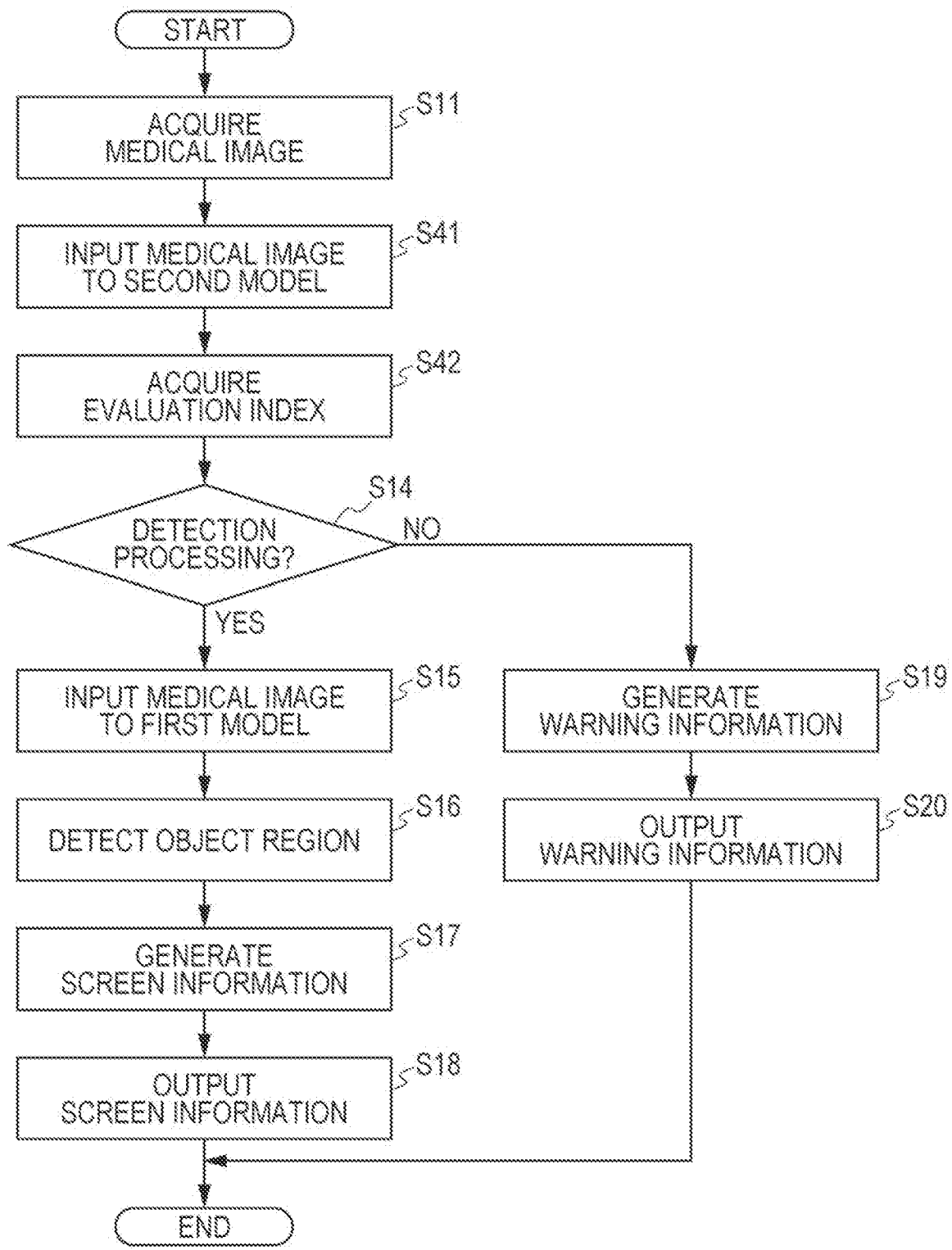
FIG. 8 is a flowchart illustrating an example of a processing procedure executed by the information processing device according to a second embodiment.

FIG. 8 is a flowchart illustrating an example of a processing procedure executed by the information processing device 1 according to the second embodiment. The same numbers are given to the processes common to those in FIG. 5 according to the first embodiment, and the detailed description of the same numbers given to the processes common to those in FIG. 5 will be omitted.

The control unit 11 of the information processing device 1 acquires the medical images of a subject from the image diagnostic device 2 (S11). The control unit 11 derives determination information based on the acquired medical image. According to the present embodiment, an evaluation index related to detection accuracy of an object region included in a medical image is derived as determination information. More specifically, the value of the loss function can be derived.

The control unit 11 inputs the acquired medical image to the second learning model 142 (S41) and acquires the value of the evaluation index to be output (S42). As a result, the determination information can be derived.

The control unit 11 determines whether to execute object region detection processing on the medical image based on the acquired evaluation index (S14). Specifically, it can be determined whether to execute the detection processing by determining whether the evaluation index for the medical image is equal to or greater than a threshold.

When the evaluation index is less than the threshold, the control unit 11 determines that the object region is detected for the medical image. When the evaluation index is equal to or greater than the threshold, the control unit 11 determines not to detect the object region for the medical image. Thereafter, the control unit 11 executes the processing of S15 to S20 illustrated in FIG. 8 in accordance with the determination result.

According to the present embodiment, by extracting a medical image estimated to have a relatively large loss function of the first learning model 141 in advance through preprocessing using the second learning model 142, it is possible to accurately detect an object region using other medical images.

The control unit 11 of the information processing device 1 may execute relearning of the second learning model 142 after the object region is detected. After the object region from the newly acquired medical image is detected using the first learning model 141, the control unit 11 acquires the value of the loss function for the detection result. The control unit 11 executes relearning using the acquired value of the loss function and the corresponding medical image as training data. The control unit 11 optimizes the weights or the like of the second learning model 142 and updates the second learning model 142. According to the above-described processing, the second learning model 142 can be further optimized through an operation of the present image diagnostic system.

Third Embodiment

In an image diagnostic system according to a third embodiment, content of determination information is different from that according to the first and second embodiments. Thus, the differences will be mainly described below. Since other configurations are similar to those of the first and second embodiments, the same reference numerals are given to common configurations, and the detailed description of the same reference numerals common to those of the first and second embodiments will be omitted.

The determination information according to the third embodiment includes information regarding presence or absence of an artifact included in a medical image. In the third embodiment, a level of detection accuracy for a medical image is estimated based on presence or absence of an artifact. Since the medical image with the artifact has a feature amount significantly different from that of the medical image without the artifact, it is estimated that the detection accuracy is lowered. A medical image with no artifact is estimated to have a relatively high detection accuracy because a change in the feature amount is relatively small.

The information processing device 1 derives the determination information using the third learning model 143. The third learning model 143 can be a machine learning model configured to output information indicating presence or absence of an artifact included in a medical image when the medical image is input. The auxiliary storage unit 14 of the information processing device 1 stores definition information regarding the third learning model 143. Like the second learning model 142 according to the second embodiment, the information processing device 1 learns the training data and generates the third learning model 143 in advance. Then, when the medical image is acquired from the image diagnostic device 2, the information processing device 1 inputs the medical image to the third learning model 143 and estimates the presence or absence of the artifact.

Figure 9:
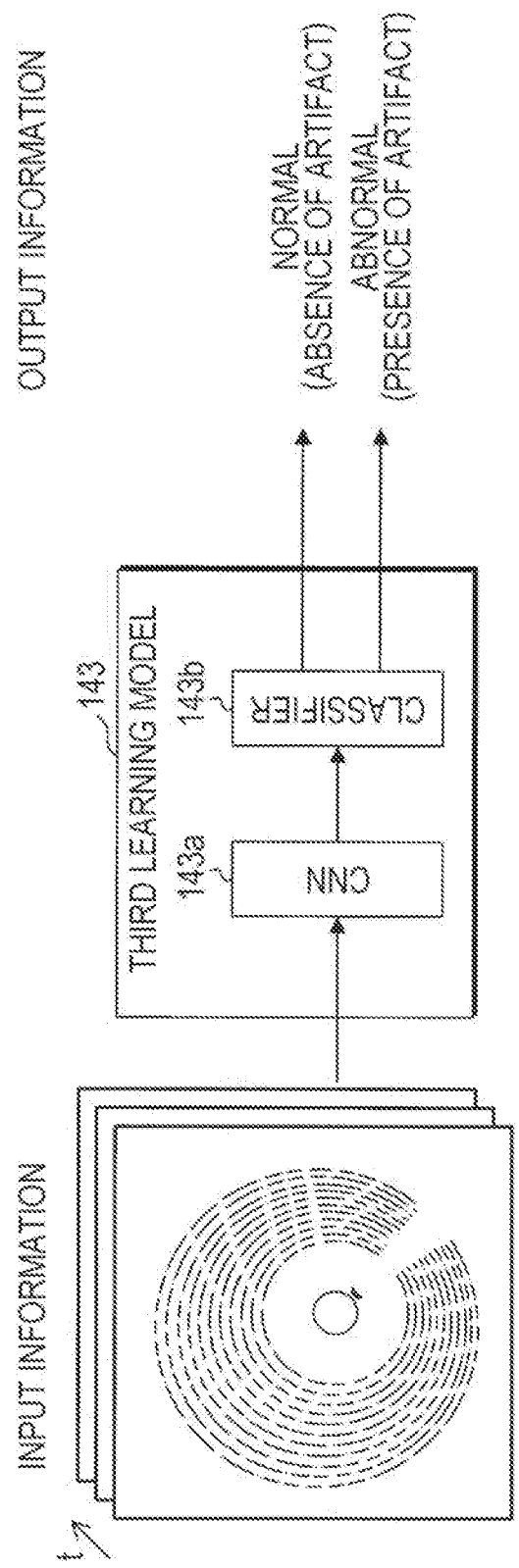
FIG. 9 is a schematic diagram illustrating a third learning model.

FIG. 9 is a schematic diagram illustrating the third learning model 143. The third learning model 143 can include, for example, a CNN 143a and a classifier 143b. The CNN 143a can be a deep learning model that receives an input of a medical image, and extracts and outputs a feature amount of the image. The CNN 143a may use a learned model trained in advance, for example, by transfer learning.

The classifier 143b can be, for example, a one-class SVM. The classifier 143b outputs a classification result obtained by classifying a medical image as "normal" or "abnormal" based on the feature amount extracted by the CNN 143a. More specifically, the classifier 143b outputs a value obtained by binary determination to determine whether the medical image corresponds to no artifact that is regarded as normal data.

The information processing device 1 executes unsupervised learning using only medical images with no large number (or substantial number) of artifacts collected in the past and using medical images with no artifacts as normal data. The classifier 143b is trained to identify "a value outside of" normal data, using medical images without artifacts as normal data. The classifier 143b identifies medical images other than medical images with no artifact, that is, medical images with an artifact as abnormal values. As a result, when medical images are input, the third learning model 143 learned so that the information indicating presence or absence of the artifact can be appropriately output is constructed.

The configuration of the third learning model 143 is not limited to the foregoing example. The third learning model 143 may be able to identify presence or absence of an artifact in the medical image. The third learning model 143 may output the classification result of the presence or absence of the artifact in the medical image by supervised learning using training data including both the medical image with the artifact and the medical image with no artifact, for example. The third learning model 143 may be a model based on another learning algorithm such as RNN or a generative adversarial network (GAN).

The information processing device 1 determines whether to detect an object region from the medical image using the presence or absence of the artifact obtained by the above-described third learning model 143 as determination information. Since it is estimated that detection accuracy of a medical image with an artifact is relatively low, an object region is not detected. Since it is estimated that the detection accuracy of the medical image with no artifact is high, an object region can be detected.

Figure 10:
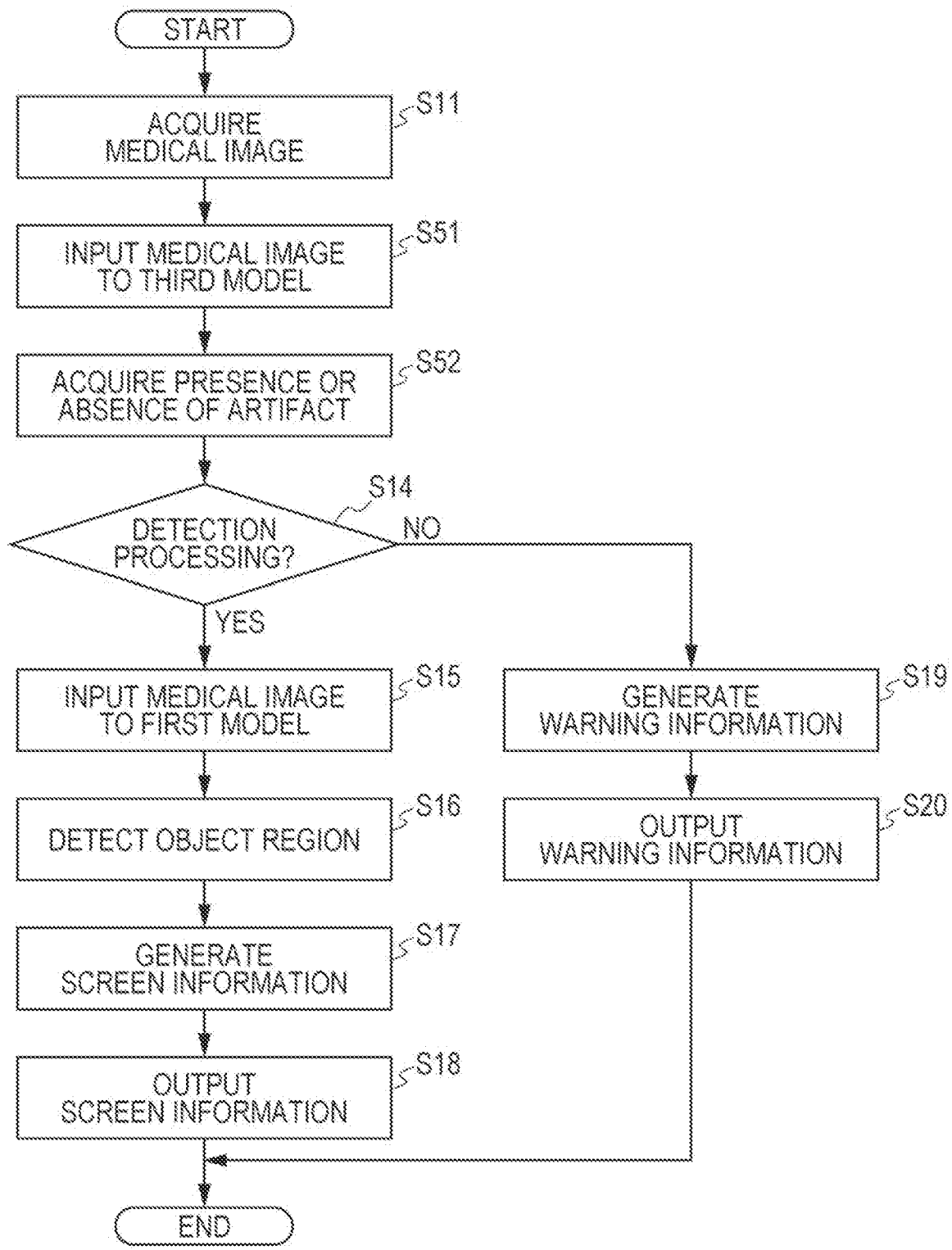
FIG. 10 is a flowchart illustrating an example of a processing procedure executed by an information processing device according to a third embodiment.

FIG. 10 is a flowchart illustrating an example of a processing procedure executed by the information processing device 1 according to the third embodiment. The same numbers are given to the processes common to those in FIG. 5 according to the first embodiment, and the detailed description of the same numbers given to the processes common to those in FIG. 5 will be omitted.

The control unit 11 of the information processing device 1 acquires the medical images of a subject from the image diagnostic device 2 (S11). The control unit 11 derives determination information based on the acquired medical image. In the present embodiment, the presence or absence of the artifact in the medical image is derived as the determination information.

The control unit 11 inputs the acquired medical image to the third learning model 143 (S51) and acquires the presence or absence of the artifact to be output (S52). As a result, the determination information is derived.

The control unit 11 determines whether to execute the object region detection processing on the medical image based on the presence or absence of the acquired artifact (S14). When there is no artifact in the medical image, the control unit 11 determines to detect an object region in the medical image. When there is an artifact in the medical image, the control unit 11 determines not to detect an object region in the medical image. Thereafter, the control unit 11 executes the processing of S15 to S20 illustrated in FIG. 10 in accordance with the determination result.

According to the present embodiment, the presence or absence of the artifact is accurately estimated using the third learning model 143. By extracting in advance, a medical image with an artifact, that is, a medical image estimated to have a relatively low detection accuracy, it is possible to accurately detect an object region using other medical images.

The information processing device 1 may determine whether to detect the object region using three types of determination information described in the first to third embodiments. For example, the information processing device 1 may determine whether to execute the detection processing by executing the preprocessing in parallel, acquiring a determination result based on each of the three types of determination information, and comprehensively evaluating the determination result. Alternatively, for example, when it is determined that the preprocessing of the first embodiment is executed and the detection processing is not executed, subsequently the information processing device 1 may subsequently execute a plurality types of preprocessing in sequence such that the preprocessing of the second embodiment is executed and the determination is executed again.

Fourth Embodiment

An image diagnostic system according to a fourth embodiment is different from the first embodiment in that postprocessing is executed on a detection result of the first learning model 141. Thus, the differences will be mainly described below. Since the other configurations are similar to those according to the first embodiment, the same reference numerals are given to the common configurations, and the detailed description of the same reference numerals will be omitted.

When the accuracy of the detection result of the object region is estimated to be low in the detection result of the object region by the first learning model 141, the information processing device 1 according to the fourth embodiment executes postprocessing to correct a boundary of the object region.

Figure 11:
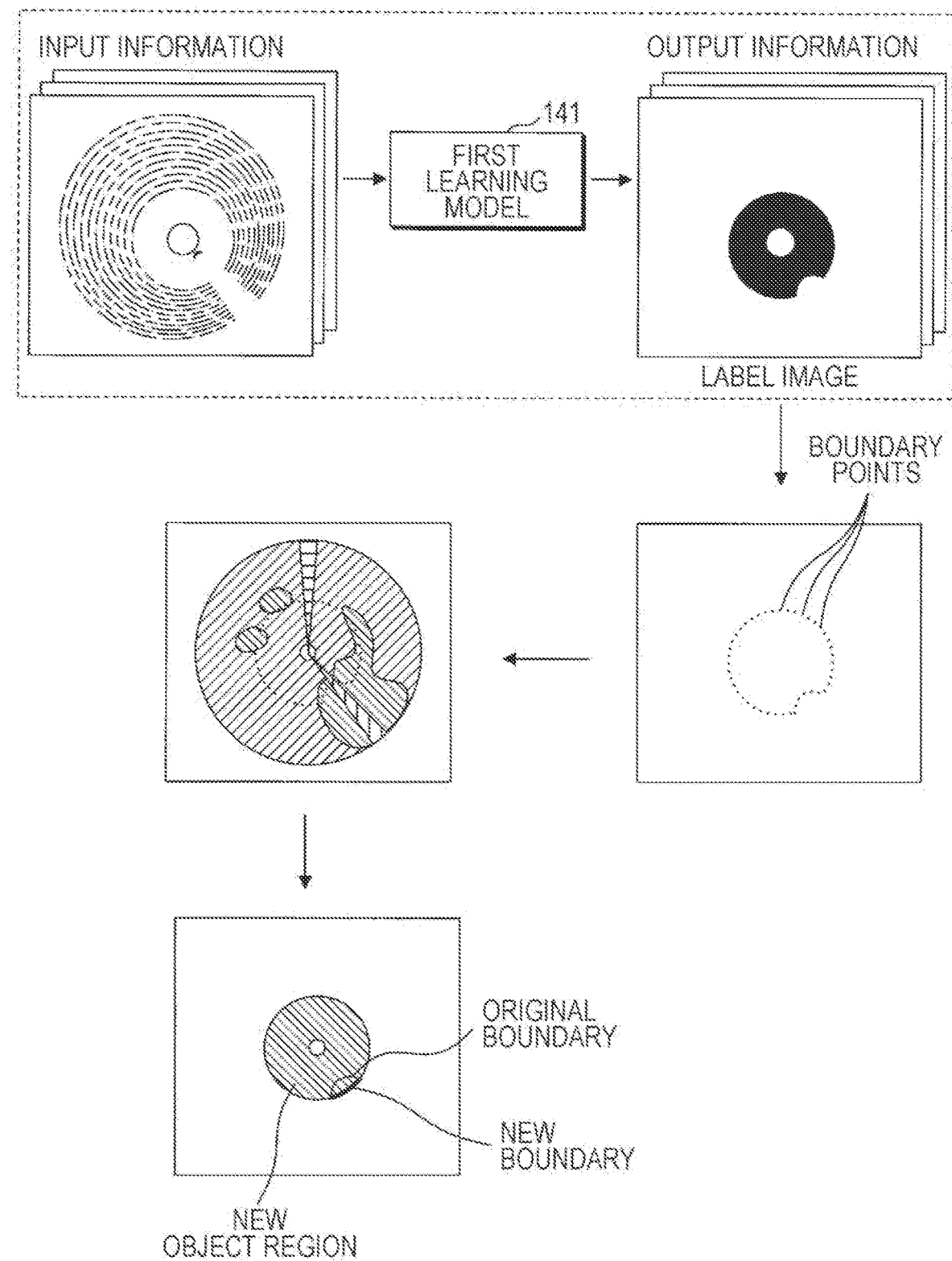
FIG. 11 is an explanatory diagram illustrating correction of an object region.

FIG. 11 is an explanatory diagram illustrating correction of an object region. The postprocessing executed by the control unit 11 of the information processing device 1 and a method of correcting the object region will be specifically described with reference to FIG. 11.

The object region is detected from the medical image using the first learning model 141. The first learning model 141 can be, for example, a semantic segmentation model and generates a label image in which an object region is displayed in black and an area other than the object region is displayed in white as illustrated in the upper right of FIG. 11. As illustrated in the middle right of FIG. 11, the control unit 11 sets a plurality of boundary points at predetermined intervals on the boundary line between the object region and another region adjacent to the object region.

Next, an output value of the activation function 141d included in the first learning model 141 is acquired. An output of the activation function 141d is obtained for each pixel of the medical image. A pixel in which an output value is within a predetermined range (for example, 0.4 to 0.6) has a relatively low accuracy of the detection result, and a pixel in which an output value is outside of the predetermined range has a relatively high accuracy of the detection result. A concept of the output value in each pixel is illustrated in the middle left of FIG. 11. In FIG. 11, right-downward hatching is applied to pixels in which the output values are within the predetermined range, and left-downward hatching is applied to pixels in which the output values are outside of the predetermined range. In the example of FIG. 11, a large number of pixels in which the output values are within the predetermined range, that is, pixels that have a relatively low accuracy are included in the lower right of the medical image.

The control unit 11 divides the medical image into a plurality of regions. As described above, since the medical image (tomographic image) obtained in accordance with the IVUS method is an image obtained by the rotation of the sensor 214, the medical image is a circular image centering on the rotation axis. The medical image is divided into a plurality of regions in the circumferential direction based on the center of the circle. Each region has, for example, a plurality of fan shapes that have the same central angle. A method of dividing the medical image and a shape of the region are not limited, but it is preferable to set regions obtained by dividing the boundary line in the medical image in a substantially vertical direction. For example, the region may be divided into belt-like rectangular regions extending in the circumferential direction from the center of the circle. Each region may partition the boundary point of the medical image and a part of each region may overlap. Although the medical image which is the polar coordinate image has been described above as an example, the medical image is not limited to the polar coordinate image. For example, the medical image may be an orthogonal coordinate image that has the circumferential direction θ and the radial direction r of the blood vessel as axes. In this case, the medical image is divided into a plurality of regions by being equally divided at predetermined intervals in the radial direction r.

The information processing device 1 calculates the reliability of the boundary points included in each region. The reliability is the degree of certainty of the detection result. The reliability can be calculated based on an output value of the activation function 141d of the pixel included in the region including the boundary point. For example, the information processing device 1 calculates a ratio of the number of pixels in which the output values are outside of the predetermined range to all the pixels in the region to acquire reliability of the boundary points in the region. The reliability may be calculated based on a variance of the output values in each pixel. When the reliability of all the boundary points is relatively high, the object region by the first learning model 141 is output to the image diagnostic device 2 without being corrected. When there are boundary points that have a relatively low reliability, a detection result of the first learning model 141 is corrected. Hatching of horizontal lines in the middle left in FIG. 11 indicates one region including boundary points that have high reliability, and hatching of vertical lines indicates one region including boundary points that have low reliability.

When there are boundary points that have low reliability, the object region is corrected by generating a new boundary through interpolation instead of a boundary including the boundary points that have low reliability. Hereinafter, processing for generating a new boundary through spline interpolation will be described as an example. The information processing device 1 removes boundary points that have low reliability by extracting boundary points that have high reliability from all the boundary points set on the boundary. By using a plurality of highly reliable boundary points and connecting the highly reliable boundary points set on both sides across the removed boundary points by a spline curve through spline interpolation, a new boundary connecting the boundary points can be generated. When a plurality of boundary points that have low reliability continue, it is preferable to interpolate between boundary points that have high reliability set on both sides of the continuing boundary point group that has low reliability.

In this way, as illustrated in the lower part of FIG. 11, a new boundary line is generated in a portion where the detection accuracy of the object region is estimated to be relatively low. With the new boundary line and the boundary line based on the detection result by the first learning model 141, an annular, that is, a closed curve boundary line complementing the edge of the object region is generated and a new object region is formed by the boundary line. A method of interpolating the boundary lines is not limited. For example, circular interpolation may be used, or interpolation may be executed using boundaries between previous and subsequent frames. A machine learning model that generates an image of a boundary line according to boundary points may be used. The information processing device 1 outputs a new object region obtained through the above-described correction to the image diagnostic device 2.

Figure 12:
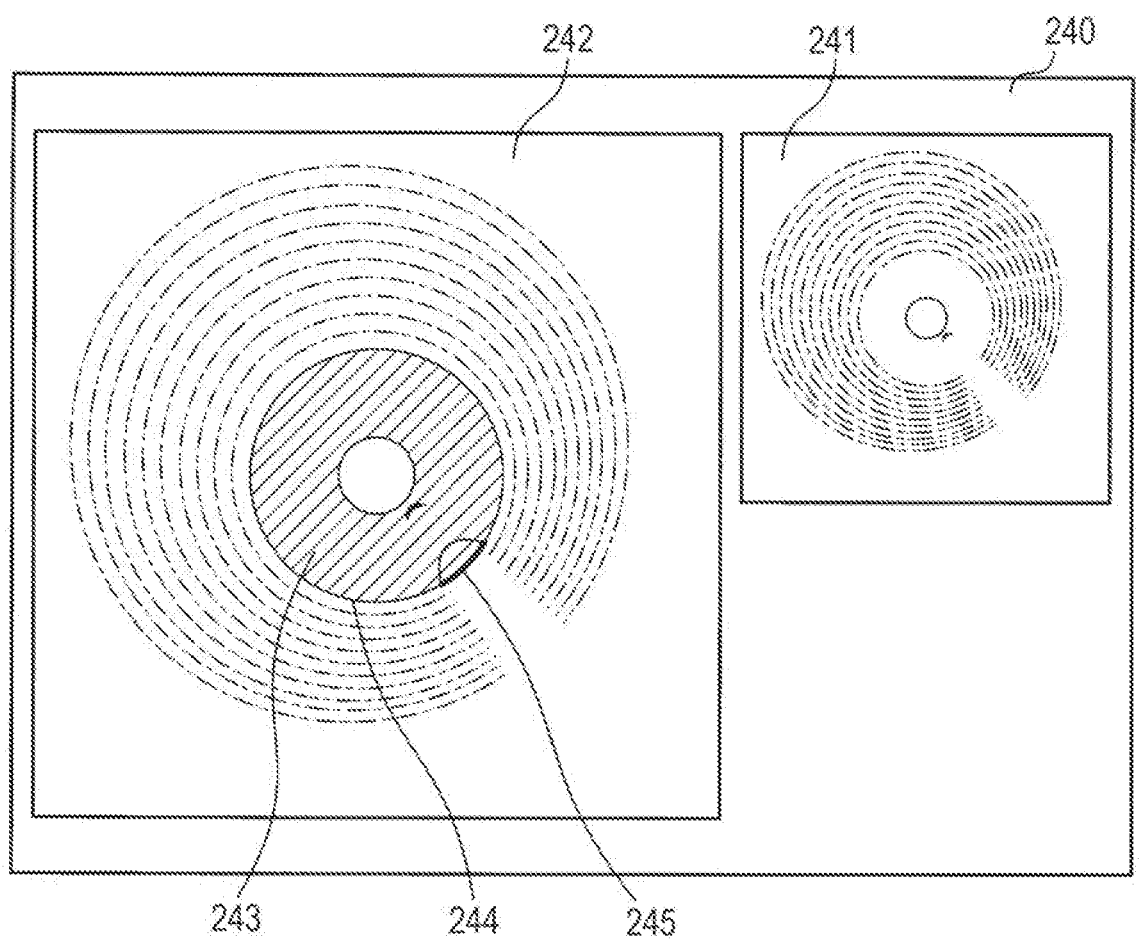
FIG. 12 is an explanatory diagram illustrating a display screen example of an image diagnostic device.

FIG. 12 is an explanatory diagram illustrating a display screen example of the image diagnostic device 2. The image diagnostic device 2 displays a display screen 240 based on the detection result information received from the information processing device 1 on the display device 24. The display screen 240 includes a medical image field 241 and an object image field 242. In the medical image field 241, a medical image generated by the image processing device 23 is displayed in real time. The object image field 242 includes an object image that displays an object region included in the medical image in a distinguishable display mode. The object image is, for example, an image in which a label image indicating the object region 243 is superimposed on the original medical image. When the boundary lines are interpolated, the control unit 11 corrects the object region of the label image according to the interpolated boundary. The control unit 11 processes the label image to a semitransparent mask and generates image information to be superimposed and displayed on the original medical image. In this case, the control unit 11 may display the object region based on the detection result of the first learning model 141 and the interpolated object region in a distinguishable display mode, for example, by setting different transparency, colors, and the like.

The object image may further include boundary lines 244 and 245 of the object region. The control unit 11 superimposes and displays a boundary line formed by the boundary line 244 based on the detection result of the first learning model 141 or the boundary line 244 based on the detection result of the first learning model 141 and the new boundary line 245 through interpolation with the original medical image. In this case, the control unit 11 may display the new boundary line 245 through interpolation with the boundary line 244 based on the detection result of the first learning model 141 in a distinguishable display mode, for example, by setting different colors, line types, and the like.

Figure 13:
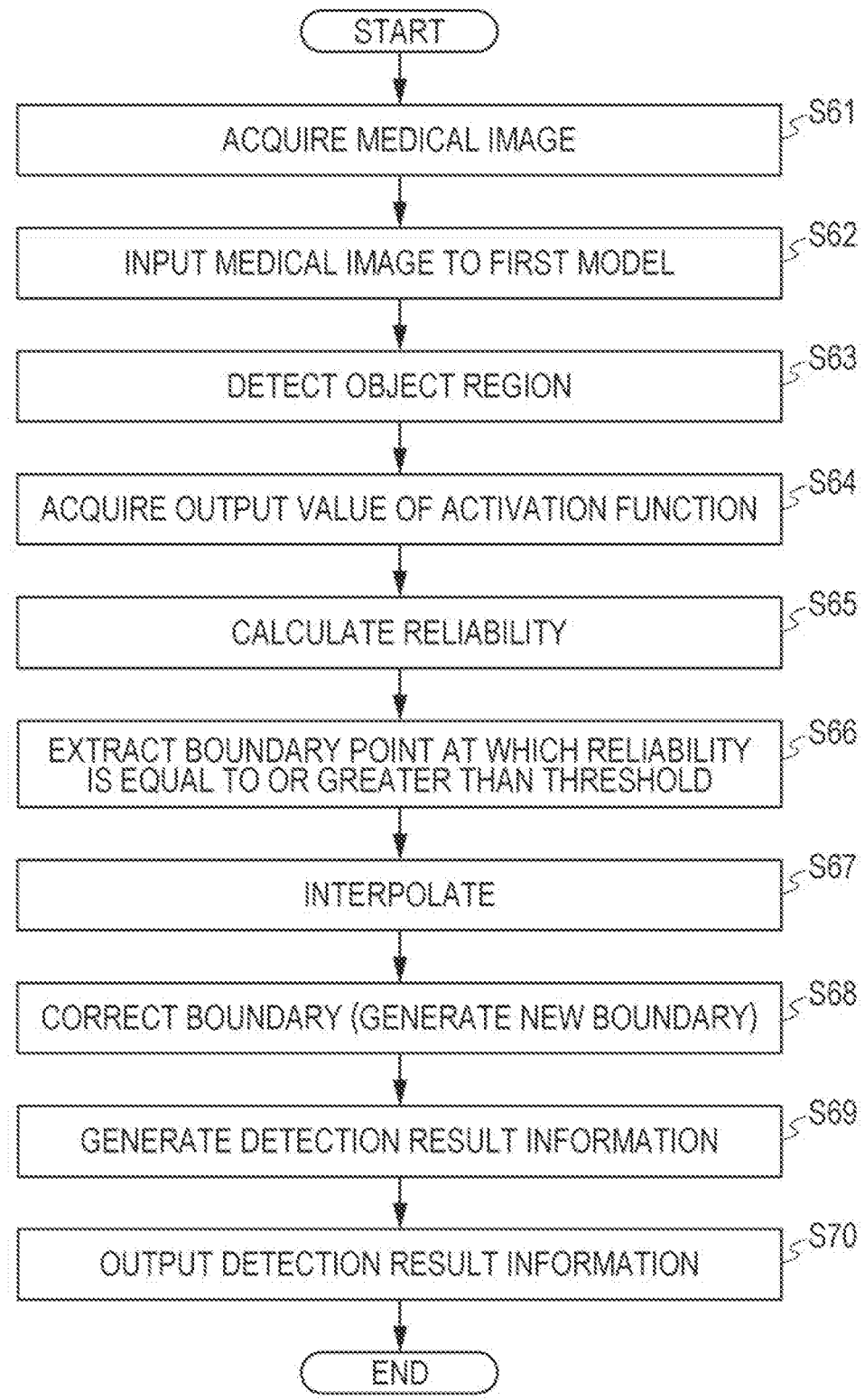
FIG. 13 is a flowchart illustrating an example of a processing procedure executed by an information processing device according to a fourth embodiment.

FIG. 13 is a flowchart illustrating an example of a processing procedure executed by the information processing device 1 according to the fourth embodiment. When the MDU 22 executes the pull-back manipulation and the medical images are output from the image diagnostic device 2, the control unit 11 of the information processing device 1 executes the following processing in accordance with the program P.

The control unit 11 of the information processing device 1 acquires the medical images of a subject from the image diagnostic device 2 (S61). The acquired medical images are images of tomographic images of a plurality of frames which continue in time series. The control unit 11 inputs the acquired medical images to the first learning model 141 (S62) to detect an object region (S63). The control unit 11 acquires a label image indicating the object region.

The control unit 11 acquires an output value of the activation function 141d in the first learning model 141 for each pixel (S64).

The control unit 11 calculates reliability of each boundary point set on the boundary between the object region and the other area based on the acquired output value (S65). Specifically, the control unit 11 divides the medical image into a plurality of fan-shaped areas and calculates the number of pixels in which the output values are outside of a predetermined range among the pixels included in each area. The control unit 11 acquires the reliability of the boundary points included in a region by calculating the ratio of pixels in which the output values are outside the predetermined range to all the pixels in the region. The control unit 11 executes the above-described processing on all the regions and calculates the reliability of all the boundary points set on the boundary.

The control unit 11 extracts boundary points at which the calculated reliability of the boundary point is equal to or greater than the threshold from all the boundary points by determining a magnitude relationship between the calculated reliability of each boundary point and a preset threshold (for example, 0.5), (S66).

The control unit 11 executes spline interpolation using the plurality of extracted boundary points (S67). The control unit 11 corrects the boundary line by generating a new boundary line (spline curve) that is set on both sides of the boundary point determined to be less than the threshold and connects the boundary points at which the reliability is equal to or greater than the threshold (S68). A new object region is formed by the new boundary line and the boundary line based on the detection result by the first learning model 141. When the reliability of all the boundary points is equal to or greater than the threshold, the above-described correction processing may be omitted.

The control unit 11 generates detection result information (screen information) for displaying the detected object region and the like (S69). The control unit 11 outputs the generated detection result information to the image diagnostic device 2 (S70) and ends the series of processing.

According to the present embodiment, by executing post-processing of correcting the boundary, an influence of an artifact in the medical image can be reduced and the object region can be appropriately detected.

In the above-described processing, the control unit 11 of the information processing device 1 may be configured to receive amendment of the interpolated boundary or the corrected object region from the user. For example, when it is determined that the interpolated boundary is to be amended, the control unit 11 acquires corrected data of the interpolated boundary by receiving an input from the user or the like and stores the amended data as a new boundary.

The control unit 11 may further execute relearning of the first learning model 141 after the object region is corrected or amended. The control unit 11 acquires amended data or corrected data of the object region in the medical image. The control unit 11 executes relearning using the acquired amended data or corrected data and the corresponding medical image as training data. The control unit 11 optimizes the weights and the like of the first learning model 141 and updates the first learning model 141. According to the above-described processing, the first learning model 141 is optimized through an operation of the image diagnostic system, and the object region can be more appropriately detected.

Fifth Embodiment

An image diagnostic system according to a fifth embodiment is different from that according to the fourth embodiment in that reliability is calculated using another element other than the output value of the activation function 141d. Thus, the differences will be mainly described below.

The information processing device 1 of the fifth embodiment calculates the reliability by using, for example, the artifact detection result in the medical image as an element other than the output value of the activation function 141d. For example, when an artifact is included in a previous frame in time series of frames (hereinafter referred to as a target frame.) that are reliability calculation targets in a plurality of frames included in medical images, there is a high possibility that an artifact also occurring in the target frame. From this viewpoint, the information processing device 1 calculates the reliability based on presence or absence of the artifact in the previous frame. When there is an artifact in the previous frame, the reliability of all the boundary points of the target frame is set to be low. When the position is acquired together with the presence or absence of the artifact, the reliability of the boundary point in the region may be set to be low in the region including the position of the target frame corresponding to the detection position of the artifact in the previous frame. The information processing device 1 may calculate the reliability using a plurality of frames which continue to the previous frame.

Further, the artifact detection result may include a type of artifact in addition to the presence or absence of the artifact. For example, when the type of artifact is a guide wire, the boundary information of the lumen region to be detected is highly likely to be missing along the shape of the guidewire. As described above, based on the position and type of artifact, the reliability of the boundary point in the region is set to be low in the region including the shape portion corresponding to the type of the artifact. The information processing device 1 stores the type of artifact and a shape portion of which a decrease in the accuracy is predicted in accordance with the type of artifact in association in advance. The information processing device 1 is not limited to use the artifact detection result in the previous frame, and may use the target frame or the artifact detection result in a subsequent frame of the target frame.

Figure 14:
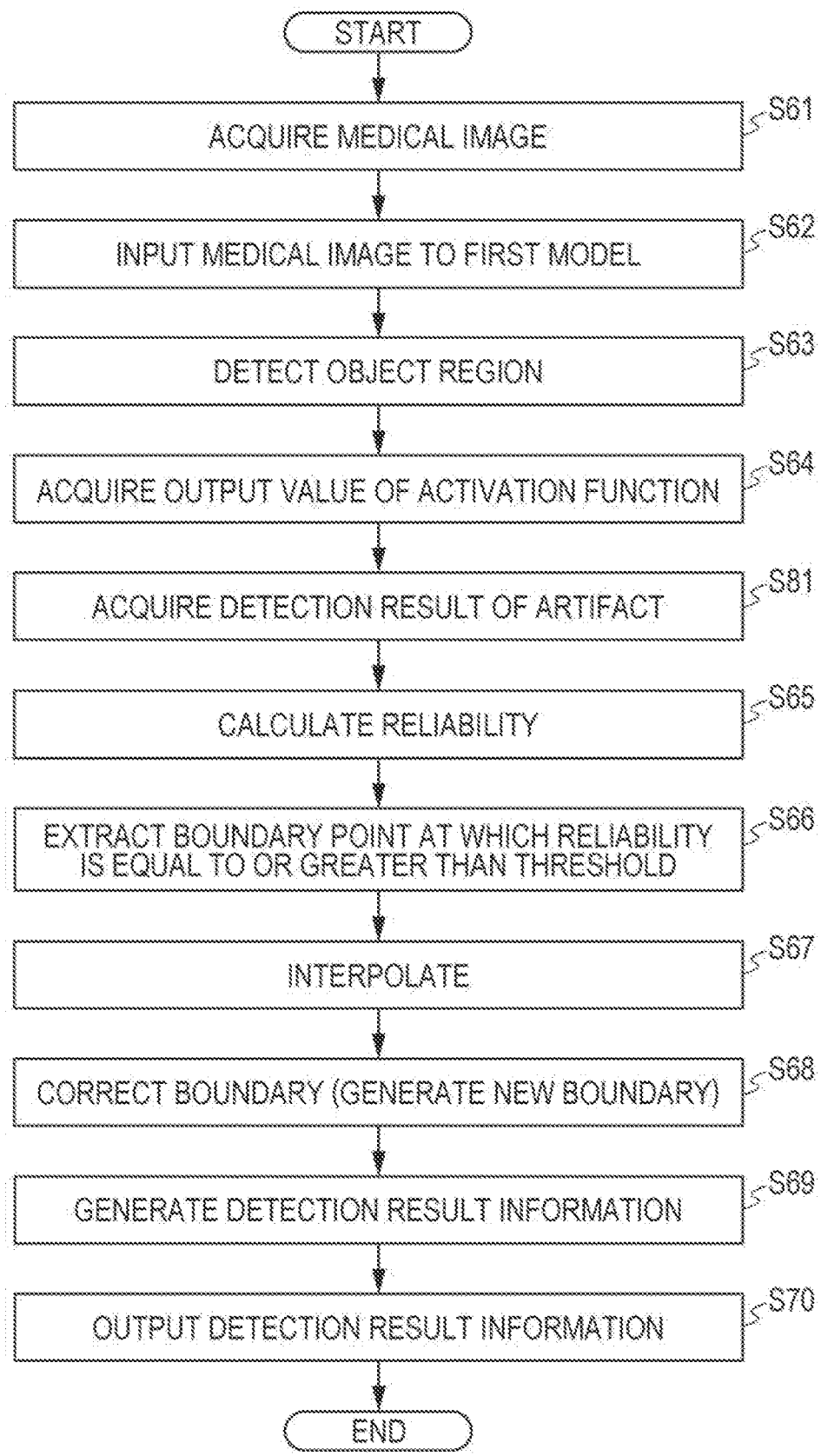
FIG. 14 is a flowchart illustrating an example of a processing procedure executed by an information processing device according to a fifth embodiment.

FIG. 14 is a flowchart illustrating an example of a processing procedure executed by the information processing device 1 according to the fifth embodiment. Processes in common with those in FIG. 13 of the fourth embodiment are denoted by the same numbers, and detailed description of the processes common with those in FIG. 13 will be omitted.

The control unit 11 of the information processing device 1 acquires the medical images of a subject from the image diagnostic device 2 (S61). The acquired medical images are images of tomographic images of a plurality of frames which continue in time series. The control unit 11 inputs the acquired medical images to the first learning model 141 (S62) to detect an object region (S63). The control unit 11 acquires an output value of the activation function 141d in the first learning model 141 for each pixel (S64).

Furthermore, the control unit 11 acquires the artifact detection result in the previous frame of a frame which is the calculation target of the reliability (S81). Although a method of acquiring the artifact detection result is not limited, for example, the artifact region may be acquired by inputting the acquired medical image to a learning model that detects the artifact region from the medical image.

The control unit 11 calculates the reliability of each boundary point set on the boundary between the object region and other regions based on the acquired output value and the artifact detection result (S65). Thereafter, the control unit 11 executes the processing of S66 to S70 illustrated in FIG. 14.

According to the present embodiment, by determining the presence or absence of boundary correction using information other than the output value, it is possible to detect the object region more appropriately.

In the examples described in the foregoing embodiments, other embodiments can be implemented by combining all or some of the configurations described in the embodiments. The sequences described in each embodiment are not limited, and each processing procedure may be executed in a changed order, or a plurality of processes may be executed in parallel.

The detailed description above describes embodiments of a program, an information processing device, and an information processing method. The invention is not limited, however, to the precise embodiments and variations described. Various changes, modifications and equivalents may occur to one skilled in the art without departing from the spirit and scope of the invention as defined in the accompanying claims. It is expressly intended that all such changes, modifications and equivalents which fall within the scope of the claims are embraced by the claims.

What is claimed is:

1. A non-transitory computer-readable medium storing a computer program executed by a computer processor to execute a process comprising:
acquiring a medical image generated based on a signal detected by a catheter inserted into a luminal organ;
detecting an object region included in the medical image by inputting the acquired medical image into a model trained for detecting the object region included in the medical image;
detecting the object region in units of pixels by semantic segmentation in the model;
acquiring an output of an activation function included in the model in each pixel included in a predetermined region of the medical image using the model;

calculating reliability of each of a plurality of boundary points located on a boundary between the detected object region and another image area in the medical image;

calculating the calculated reliability of a boundary point included in the predetermined region based on a ratio of pixels in which the output of the activation function to all the pixels included in the predetermined region of the medical image is within a predetermined range;

correcting the boundary based on a detection result of the object region by the model by performing interpolation using the boundary points at which the calculated reliability satisfies a predetermined standard; and generating screen information that displays the detected object region.

2. The computer-readable medium according to claim 1, further comprising:

generating screen information that displays a boundary based on a detection result of the object region by the model and a new boundary generated by correcting the boundary based on the detection result of the object region by the model in different display modes; and outputting the generated screen information that displays the boundary based on the detection result of the object region by the model and the new boundary generated by correcting the boundary based on the detection result of the object region by the model in different display modes.

3. The computer-readable medium according to claim 1, further comprising:

generating a new boundary for correcting the boundary based on a detection result of the object region by performing spline interpolation using the boundary points at which the calculated reliability satisfies a predetermined standard.

4. The computer-readable medium according to claim 1, further comprising:

acquiring an output of an activation function included in the model; and calculating the calculated reliability based on the acquired output of the activation function.

5. The computer-readable medium according to claim 1, further comprising:

calculating the calculated reliability based on presence or absence of an artifact in the medical image.

6. An information processing device comprising:

a control unit comprising a processor configured to:

acquire a medical image generated based on a signal detected by a catheter inserted into a luminal organ;

detect an object region included in the medical image by inputting the acquired medical image into a model trained for detecting the object region included in the medical image;

detect the object region in units of pixels by semantic segmentation in the model;

acquire an output of an activation function included in the model in each pixel included in a predetermined region of the medical image using the model;

calculate reliability of each of a plurality of boundary points located on a boundary between the detected object region and another image area in the medical image;

calculate the calculated reliability of a boundary point included in the predetermined region based on a ratio of pixels in which the output of the activation function to all the pixels included in the predetermined region of the medical image is within a predetermined range;

correct the boundary based on a detection result of the object region by the model by performing interpolation using the boundary points at which the calculated reliability satisfies a predetermined standard; and generate screen information that displays the detected object region.

7. The information processing device according to claim 6, wherein the control unit is further configured to:

generate screen information that displays a boundary based on a detection result of the object region by the model and a new boundary generated by correcting the boundary based on the detection result of the object region by the model in different display modes; and output the generated screen information that displays the boundary based on the detection result of the object region by the model and the new boundary generated by correcting the boundary based on the detection result of the object region by the model in different display modes on a display.

8. The information processing device according to claim 6, wherein the control unit is further configured to:

generate a new boundary for correcting the boundary based on a detection result of the object region by performing spline interpolation using the boundary points at which the calculated reliability satisfies a predetermined standard.

9. The information processing device according to claim 6, wherein the control unit is further configured to:

acquire an output of an activation function included in the model; and calculate the calculated reliability based on the acquired output of the activation function.

10. The information processing device according to claim 6, wherein the control unit is further configured to:

calculate the calculated reliability based on presence or absence of an artifact in the medical image.

11. An information processing method comprising:

acquiring a medical image generated based on a signal detected by a catheter inserted into a luminal organ;

detecting an object region included in the medical image by inputting the acquired medical image into a model trained for detecting the object region included in the medical image;

detecting the object region in units of pixels by semantic segmentation in the model;

acquiring an output of an activation function included in the model in each pixel included in a predetermined region of the medical image using the model;

calculating reliability of each of a plurality of boundary points located on a boundary between the detected object region and another image area in the medical image;

calculating the calculated reliability of a boundary point included in the predetermined region based on a ratio of pixels in which the output of the activation function to all the pixels included in the predetermined region of the medical image is within a predetermined range;

correcting the boundary based on a detection result of the object region by the model by performing interpolation using the boundary points at which the calculated reliability satisfies a predetermined standard; and generating screen information that displays the detected object region.

12. The information processing method according to claim 11, further comprising:

generating screen information that displays a boundary based on a detection result of the object region by the model and a new boundary generated by correcting the boundary based on the detection result of the object region by the model in different display modes; and outputting the generated screen information that displays the boundary based on the detection result of the object region by the model and the new boundary generated by correcting the boundary based on the detection result of the object region by the model in different display modes.

13. The information processing method according to claim 11, further comprising:

generating a new boundary for correcting the boundary based on a detection result of the object region by performing spline interpolation using the boundary points at which the calculated reliability satisfies a predetermined standard.

14. The information processing method according to claim 11, further comprising:

acquiring an output of an activation function included in the model; and calculating the calculated reliability based on the acquired output of the activation function.

15. The information processing method according to claim 11, further comprising:

calculating the calculated reliability based on presence or absence of an artifact in the medical image.

16. The information processing method according to claim 11, further comprising:

generating warning information when the object region is not detected in the acquired medical image because the ratio of pixels in which the output of the activation function to all the pixels included in the predetermined region of the medical image is equal to or greater than the predetermined range.

17. The information processing method according to claim 16, wherein the warning information is one or more of a text or audio data.

* * * * *